No. 850,783. PATENTED APR. 16, 1907.
P. RICHARDSON.
VEHICLE RUNNING GEAR.
APPLICATION FILED SEPT. 20, 1906.
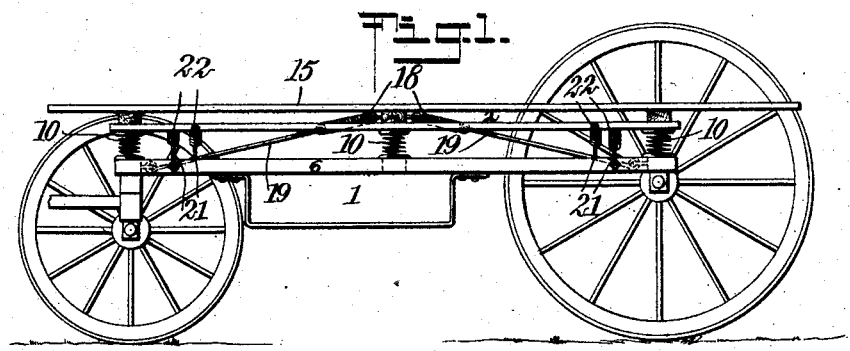
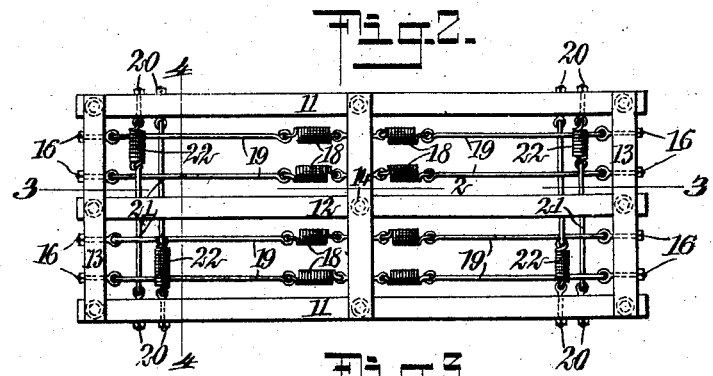
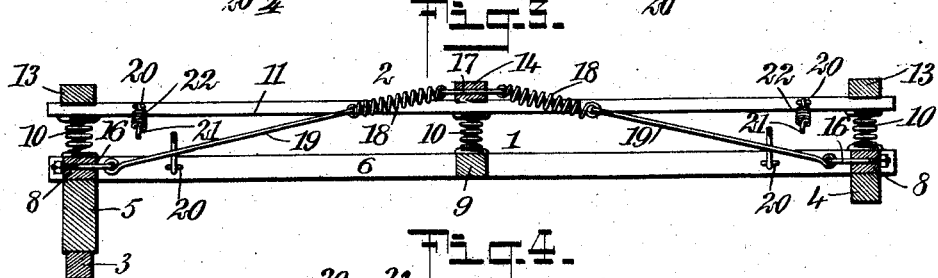
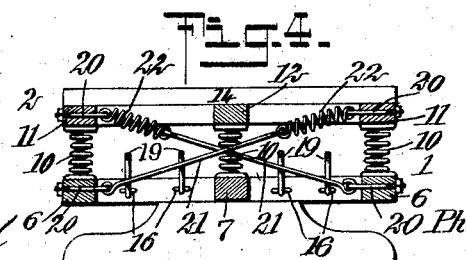
WITNESSES
H. G. Dieterich
P. W. Holt
INVENTOR
Phineas Richardson
BY Munn & Co
ATTORNEYS

UNITED STATES PATENT OFFICE.

PHINEAS RICHARDSON, OF KENNEBAGO LAKE, MAINE.

VEHICLE RUNNING-GEAR.

No. 850,783.	Specification of Letters Patent.	Patented April 16, 1907.

Application filed September 20, 1906. Serial No. 335,394.

*To all whom it may concern:*

Be it known that I, PHINEAS RICHARDSON, a citizen of the United States, and a resident of Kennebago Lake, in the county of Franklin and State of Maine, have invented a new and Improved Vehicle Running-Gear, of which the following is a full, clear, and exact description.

This invention is an improvement in vehicle running-gear, more especially designed for buckboards, and embodying a construction that will withstand the shock of very rough roads and avoid the transmission of the same to the vehicle's occupants. This is accomplished by providing for the yielding in all directions of an upper frame on which the bed or body of the vehicle is mounted, as by a system of springs comprising upright springs for yieldingly maintaining the weight of the vehicle-body and the occupants and diagonally-extending longitudinal and transverse springs for admitting of a yielding end and side movement of the body, respectively.

Reference is to be had to the accompanying drawings, forming a part of this specification, in which similar characters of reference indicate corresponding parts in all the figures.

Figure 1 is a side elevation of a running-gear for a vehicle embodying my improvement. Fig. 2 is a plan view of the same. Fig. 3 is a longitudinal vertical section substantially on the line 3 3 of Fig. 2, and Fig. 4 is a transverse section on the line 4 4 of Fig. 2.

The invention comprises a lower frame 1 and an upper frame 2, the frame 1 being preferably rigidly carried on front and rear axletrees 3 and 4, respectively, the forward axletree being provided with a bolster-block 5 to maintain the running-gear in a level position. The lower frame 1 consists of side sills 6 and an intermediate sill 7, rigidly connected together by transverse end beams 8 and an intermediate transverse beam 9, the sills and beams being arranged in the same plane. At the intersection of each sill with each beam an upright spring 10 is provided, which support the upper frame 2 and carry the weight of the vehicle-bed and its occupants. The frame 2 consists of side sills 11 and an intermediate sill 12, all of which are rigidly connected together by transverse end beams 13 and a tranverse central beam 14, the beams being preferably fixed to the top of the sills and provide means on which the bed or body 15 of the buckboard or other vehicle is carried.

For diagonally bracing the upper frame 2 of the running-gear and also providing for a yielding end movement of the same each of the end beams 8 of the frame 1 carries a series of eyebolts 16, which are connected with eyed rods 17 through intermediate, longitudinal, and diagonally-extending coil-springs 18 and links 19, the springs being preferably arranged adjacent to and connected with the rods 17, whereas the links 19 connect the lower ends of the springs and eyebolts together. It is apparent by this construction that when the upper frame is moved longitudinally in either direction one set of the springs 18 will be distended and will act to draw the frame back to normal position opposed to the springs 18, arranged at the opposite side of the transverse beam 14.

Near each end of the side sills 6 and 11 of the frames 1 and 2, respectively, eyebolts 20 are provided, which serve to connect the two frames transversely together through the intermediate links 21 and coil-springs 22, extending in a diagonal direction, the springs 22, as shown, being preferably arranged adjacent to the upper frame. These springs 22 act to admit of a yielding side movement of the upper frame and the structure carried by it, relieving the vehicle and the occupants carried thereon of side shock when passing over rough roads.

Although I have described the invention in detail in order that the construction and working of the same might be fully understood, I regard the precise embodiment as not material, provided the essential characteristics are employed as pointed out in the annexed claims.

Having thus described my invention, I claim as new and desire to secure by Letters Patent—

1. A vehicle running-gear comprising a lower frame and an upper frame, upright springs arranged between the two frames, a system of springs diagonally extending at each side of the center of the upper frame and connected to the opposite ends of the lower frame, and a system of transverse, diagonally-arranged springs connecting the two frames together near each end.

2. A vehicle running-gear comprising an upper and a lower frame, upright springs arranged between the two frames, a plurality of longitudinal springs and connecting-links arranged at each side of the transverse center of the frames connecting said frames together, and a plurality of transverse, diagonally-extending springs and connecting-links connecting said frames together near each end.

3. A vehicle running-gear comprising a lower frame and an upper frame, each frame consisting of side sills and a central sill connected together by end beams and a central beam, an upright spring intermediate the two frames at the intersection of each sill and beam, longitudinally and diagonally arranged springs connecting the two frames together, and transversely and diagonally arranged springs connecting the two frames together for the purpose described.

4. A vehicle running-gear comprising two frames, upright springs arranged therebetween, a series of longitudinal springs and connecting-links arranged at each side of the transverse center of the frames and connecting said frames together, a plurality of springs, and connecting-links transversely and diagonally extending between the two frames connecting them together near each end, for the purpose described.

In testimony whereof I have signed my name to this specification in the presence of two subscribing witnesses.

PHINEAS RICHARDSON.

Witnesses:
   J. D. HUNTOON,
   PRUDENCE RICHARDSON.